United States Patent
Nozaki et al.

(10) Patent No.: US 10,414,310 B2
(45) Date of Patent: Sep. 17, 2019

(54) SEAT WITH ARMREST, AND ARMREST UNLOCKING DEVICE FOR USE THEREWITH

(71) Applicant: TACHI-S CO., LTD., Tokyo (JP)

(72) Inventors: Hiroyuki Nozaki, Tokyo (JP); Masaaki Honda, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 167 days.

(21) Appl. No.: 15/529,921

(22) PCT Filed: Nov. 26, 2015

(86) PCT No.: PCT/JP2015/083195
§ 371 (c)(1),
(2) Date: May 25, 2017

(87) PCT Pub. No.: WO2016/084885
PCT Pub. Date: Jun. 2, 2016

(65) Prior Publication Data
US 2017/0327013 A1 Nov. 16, 2017

(30) Foreign Application Priority Data

Nov. 26, 2014 (JP) ................... 2014-238845

(51) Int. Cl.
*B60N 2/75* (2018.01)
*B60N 2/90* (2018.01)
*A47C 7/54* (2006.01)

(52) U.S. Cl.
CPC .............. *B60N 2/753* (2018.02); *A47C 7/54* (2013.01); *B60N 2/75* (2018.02); *B60N 2/943* (2018.02);

(Continued)

(58) Field of Classification Search
CPC ........ B60N 2/4606; B60N 2/753; B60N 2/75; B60N 2/943; B60N 2/767; B60N 2002/952

See application file for complete search history.

(56) References Cited

U.S. PATENT DOCUMENTS

| 5,248,184 A | * | 9/1993 | Morris | ................ B60N 2/2231 297/362 |
| 6,467,847 B2 | * | 10/2002 | Bidare | ................ B60N 2/767 297/411.32 |
| 8,066,330 B2 | * | 11/2011 | Keller | ................ B60N 2/856 297/408 |

FOREIGN PATENT DOCUMENTS

| JP | H02-9157 U | 1/1990 |
| JP | H04-16948 U | 2/1992 |

(Continued)

OTHER PUBLICATIONS

International Search Report for PCT/JP2015/083195 dated Feb. 16, 2016; English translation submitted herewith (5 pages).

*Primary Examiner* — David R Dunn
*Assistant Examiner* — Tania Abraham
(74) *Attorney, Agent, or Firm* — Fitch, Even, Tabin & Flannery, LLP

(57) ABSTRACT

In the case of a seat with an armrest on an automobile, an armrest lock mechanism may be released by, for example, the gravitational acceleration (G) in the event of vehicle collision. Accordingly, it is necessary to provide an anti-G spring for biasing to prevent the lock mechanism from being easily released. The purpose of the present invention is to provide an armrest unlocking device that enables a decrease in size of the anti-G spring. In order to solve the problem, provided is an armrest unlocking device in gear, the device operating such that the locking of the lock gear and the sector gear can be released by operating a lever link bracket (Continued)

so as to raise the lock gear, wherein the lock gear has a center of rotation thereof aligned with the position of the center of gravity.

16 Claims, 3 Drawing Sheets

(52) U.S. Cl.
CPC ........ *B60N 2/767* (2018.02); *B60N 2002/952* (2018.02)

(56) References Cited

FOREIGN PATENT DOCUMENTS

| | | |
|---|---|---|
| JP | H04-46862 U | 4/1992 |
| JP | 2000-500214 A | 1/2000 |
| JP | 2000-158988 A | 6/2000 |

\* cited by examiner

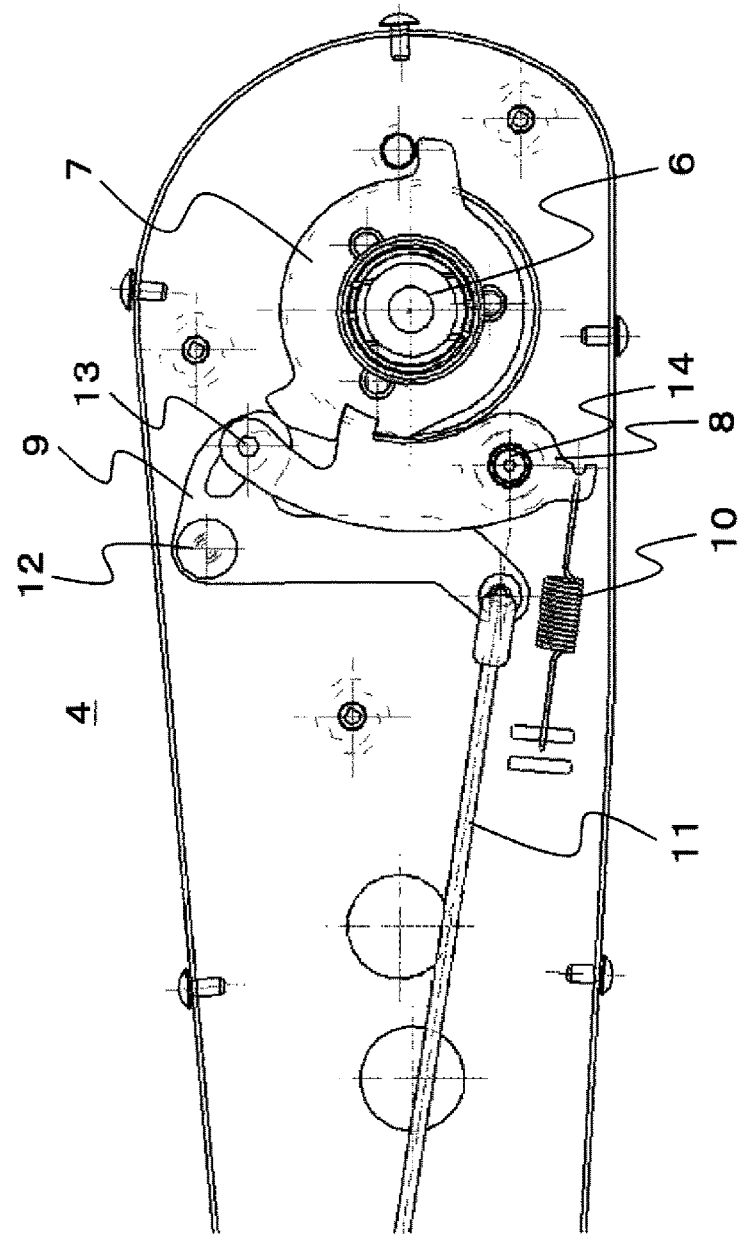

SEAT WITH ARMREST, AND ARMREST UNLOCKING DEVICE FOR USE THEREWITH

CROSS-REFERENCE TO RELATED APPLICATIONS

This application is a U.S. national phase application filed under 35 U.S.C. § 371 of International Application No. PCT/JP2015/083195, filed Nov. 26, 2015, designating the United States, which claims priority from Japanese Patent Application No. 2014-238845, filed Nov. 26, 2014, which are hereby incorporated herein by reference in their entirety.

TECHNICAL FIELD

The present invention relates to an armrest-equipped seat, and more specifically to an armrest unlocking device.

BACKGROUND ART

For example, in the case in which an automobile is provided with an armrest-equipped seat equipped with an armrest, on which an arm or the like is reclined, the armrest is sometimes movable making allowance for sitting down and rising from the seat. Typically, this movable armrest is fixed almost horizontally to the side surface of the seat back when used. When stored, the movable armrest is lifted upwardly and fixed almost vertically to the side surface of the seat back.

The movable armrest has to be fixed so as not to easily move when used. When the movable armrest is stored because it is not used, the locked movable armrest in the use state once has to be unlocked from the fixed state, and is moved to a storage position.

As a device for releasing this fixed state, there is Japanese Unexamined Patent Application Publication (Translation of PCT Application) No. 2000-500214 (PTL 1), for example. PTL 1 discloses a structure in which a rocking ratchet 6, which corresponds to a lock gear, swings at an axis 6A, which is a rotation center, and the ratchet 6 is fixed to lock a gear 6B.

CITATION LIST

Patent Literature

PTL 1: Japanese Unexamined Patent Application Publication (Translation of PCT Application) No. 2000-500214

SUMMARY OF INVENTION

Technical Problem

In the case of an armrest-equipped seat provided on an automobile and other vehicles, the locking mechanism of the armrest is sometimes unlocked due to gravitational acceleration (G), which is applied to the armrest in the event of a vehicle collision, for example. To avoid this, an anti-G spring is necessary for applying bias so as not to easily unlock the locking mechanism.

In PTL 1, an elastic member 10 is included for biasing the rocking ratchet 6, which corresponds to the lock gear. As a measure in the case in which the lock gear receives G, no consideration is paid to a decrease in the size of this elastic member 10.

The present invention is made in view of these problems. An object is to provide an armrest unlocking device that can achieve a decrease in the size of an anti-G spring.

Solution to Problem

In order to solve the problem, configurations described in claims, for example, are adopted. The present invention includes a variety of solutions to the problem. An example of the solutions is an armrest unlocking device including a lock gear configured to be biased by an elastic member and rotated about a rotation center of the lock gear to be locked with a sector gear, in which a lever link bracket is manipulated to pull the lock gear for releasing locking between the lock gear and the sector gear. In the lock gear, the rotation center is matched with a gravity center position.

Advantageous Effects of Invention

According to the present invention, an armrest unlocking device that can achieve a decrease in the size of an anti-G spring can be provided.

BRIEF DESCRIPTION OF DRAWINGS

FIG. 4 is a structural diagram of the inside of the base frame of an armrest according to a conventional example.

DESCRIPTION OF EMBODIMENTS

In the following, an embodiment of the present invention will be described with reference to the drawings.

Embodiment

Figure 1:
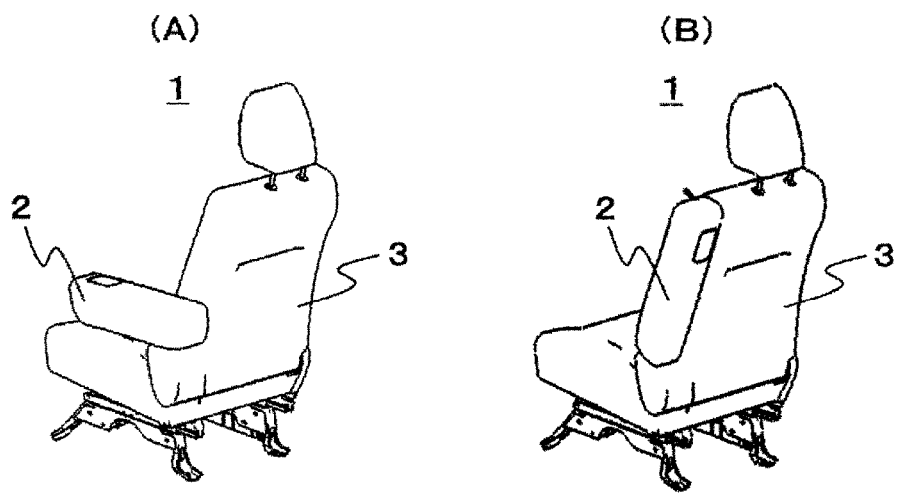
FIG. 1 is an external view of an armrest-equipped seat according to an embodiment.

FIG. 1 is an external view of an armrest-equipped seat according to an embodiment. In FIG. 1, 1 denotes an armrest-equipped seat provided on an automobile and the like, 2 denotes an armrest, and 3 denotes a seat back. (A) shows the state in which the armrest 2 is used. The armrest 2 is fixed almost horizontally to the side surface of the seat back 3. (B) shows the state in which the armrest 2 is stored. The armrest 2 is lifted upwardly, and fixed almost vertically to the side surface of the seat back 3. In other words, the armrest 2 is rotatably supported on the side surface of the seat back 3. The armrest 2 includes a locking mechanism that fixes the armrest when the armrest is used. In storing the armrest, an unlocking mechanism that releases the fixing of the armrest is necessary so that the armrest is rotatable.

Figure 2:
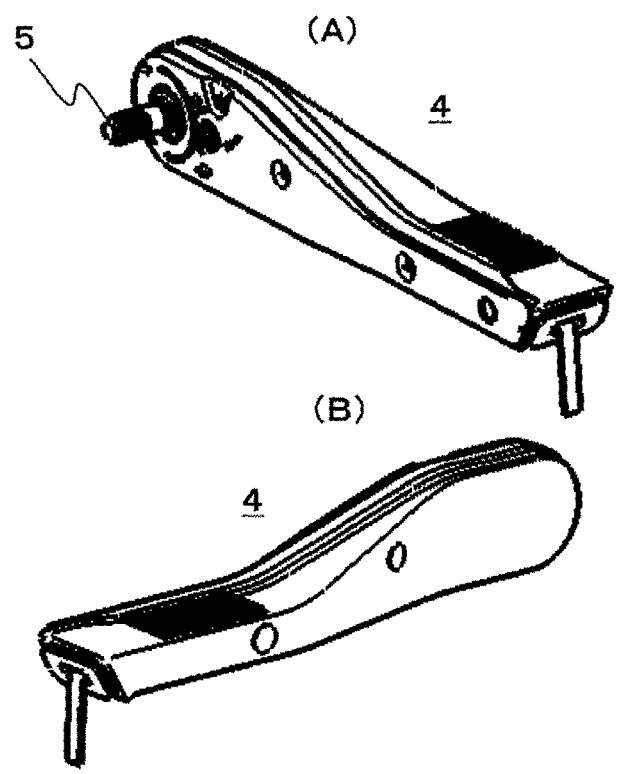
FIG. 2 is a perspective view of the armrest part of the armrest-equipped seat according to an embodiment.

The armrest is configured of a base frame and a cushion covering the base frame. FIG. 2 is a perspective view of the base frame of the armrest according to the embodiment. In FIG. 2, (A) is a perspective view of the base frame 4 when viewed from the side where the armrest is rotatably supported on the side surface of the seat back. 5 denotes a support shaft supported on the side surface of the seat back. (B) is a perspective view of the base frame 4 when viewed from the opposite side of (A).

Here, first, a conventional armrest unlocking device, which is a premise of the present invention, will be described with reference to the drawings.

FIG. 4 is a structural diagram of the inside of the base frame of an armrest according to a conventional example, showing the structure on the rotation center side of the base frame 4, i.e. the structure on the rotation center side of the armrest. In FIG. 4, 6 denotes the rotational center axis of a base frame 4, 7 denotes a sector gear, 8 denotes a lock gear, 9 denotes a lever link bracket, 10 denotes a spring, 11 denotes a wire, 12 denotes the rotation center of the lever link bracket 9, 13 denotes an engagement part between the lock gear 8 and the lever link bracket 9, and 14 denotes the rotation center of the lock gear 8. The lock gear 8 is configured in which the lock gear 8 is biased by the spring 10 and locked with the sector gear 7. When the wire 11 is pulled in the left direction of FIG. 4, the lever link bracket 9 is rotated clockwise about the rotation center 12. The lock gear 8 is then rotated counterclockwise about the rotation center 14 through the engagement part 13 between the lever link bracket 9 and the lock gear 8. Thus, the lock gear 8 is pulled, and acts so as to release the locking between the lock gear 8 and the sector gear 7.

Here, for example, when the lock gear 8 receives G in the event of a vehicle collision, the moment of inertia occurs at the center of gravity of the lock gear 8 about the rotation center 14 because the gravity center position is apart from the rotation center 14 in the lock gear 8, causing the possibility of releasing the locking between the lock gear 8 and the sector gear 7. Thus, for a measure against this problem, a necessity arises that the biasing force of the spring 10 is reinforced for a measure against anti-G, causing a problem in that the spring 10 is increased in size as an anti-G spring. In the following, an embodiment of the present invention will be described with reference to the drawings.

Figure 3:
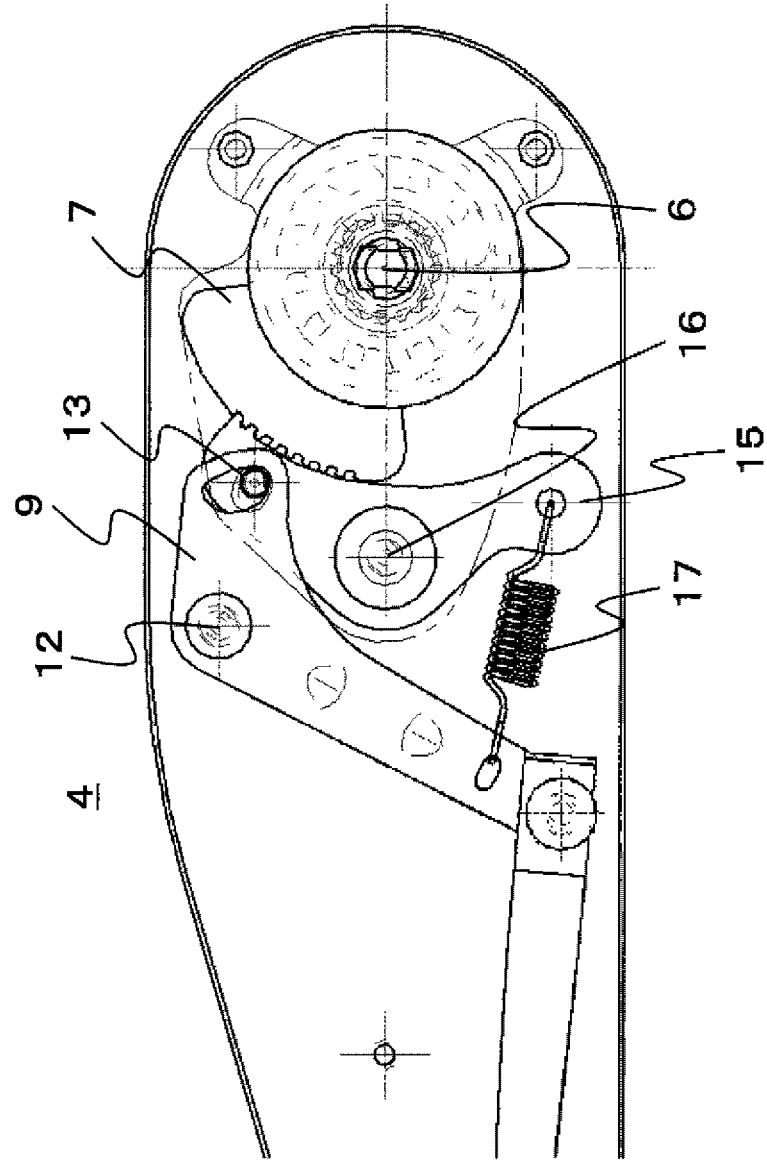
FIG. 3 is a structural diagram of the inside of the base frame of an armrest according to the embodiment.

FIG. 3 is a structural diagram of the inside of the base frame of the armrest according to the embodiment. In FIG. 3, components having functions similar to the components in FIG. 4 are designated the same reference numerals and signs, and the description is omitted. FIG. 3 is different from FIG. 4 in that a rotation center 16 of a lock gear 15 is matched with the gravity center position of the lock gear 15. Thus, for example, even though the lock gear 15 receives G in the event of a vehicle collision, the moment of inertia does not occur at the center of gravity of the lock gear 15 about the rotation center 16, because the lock gear 15 has the gravity center position matched with the rotation center 16. Consequently, it is unnecessary to reinforce the biasing force of a spring 17 applying a bias so as to lock the lock gear 15 with the sector gear 7 for the anti-G measure, allowing a decrease in the size of the spring 17 to be achieved. In other words, the moment arm is more shortened as the gravity center position is closer to the rotation center, allowing a decrease in induced moment. Hence, in the embodiment, the rotation center is matched with the gravity center position. However, a decrease in the size of the spring can be achieved by bringing the rotation center close to the gravity center position without completely matching the rotation center with the gravity center position.

Note that, in the embodiment, the moment of inertia of the lock gear caused by G in the event of a vehicle collision is described. Also regarding the lever link bracket, the rotation center is matched with the gravity center position in the lever link bracket, or the rotation center is brought close to the gravity center position. Hence, the moment of inertia of the lever link bracket caused by G in the event of a vehicle collision can be reduced, and malfunction can be prevented.

The spring only has to be a spring that applies biasing force, which may be an elastic member including a plate spring and other springs, for example.

As described above, the embodiment is the armrest unlocking device configured in which the lock gear is biased by the elastic member and rotated about the rotation center, and then the lock gear is locked with the sector gear. In the armrest unlocking device, the lever link bracket is manipulated to pull the lock gear for releasing the locking between the lock gear and the sector gear. The rotation center is matched with the gravity center position in the lock gear.

The lever link bracket is configured in which the lever link bracket is rotated about the rotation center of the lever link bracket to rotate the lock gear about the rotation center of the lock gear through the engagement part between the lever link bracket and the lock gear and the lock gear releases the locking between the lock gear and the sector gear.

As described above, according to the embodiment, it is possible to provide the armrest unlocking device that can achieve a decrease in the size of the anti-G spring.

So far, the embodiment is described. However, the present invention is not limited to the forgoing embodiment, and includes various exemplary modifications. The foregoing embodiment provides the detailed description for easily understanding the present invention. The present invention is not limited to ones including all the described configurations. A part of the configuration of the embodiment can be replaced by another configuration.

REFERENCE SIGNS LIST

1: armrest-equipped seat,
2: armrest,
3: seat back,
4: base frame,
5: support shaft,
6: rotational center axis of a base frame,
7: sector gear,
8, 15: lock gear,
9: lever link bracket,
10, 17: spring,
11: wire,
12: rotation center of a lever link bracket,
13: engagement part between a lock gear and a lever link bracket
14, 16: rotation center of a lock gear

The invention claimed is:
1. An armrest unlocking device comprising
   a lock gear configured to be biased by an elastic member and rotated about a rotation center of the lock gear to be locked with a sector gear, in which a lever link bracket is manipulated to pull the lock gear for releasing locking between the lock gear and the sector gear,
   wherein in the lock gear, the rotation center is matched with a gravity center position.
2. The armrest unlocking device according to claim 1,
   wherein the lever link bracket is rotated about a rotation center of the lever link bracket to rotate the lock gear about the rotation center of the lock gear through an engagement part between the lever link bracket and the lock gear, and the lock gear releases the locking between the lock gear and the sector gear.
3. The armrest unlocking device according to claim 1,
   wherein the lever link bracket is configured to be manipulated to rotate about a rotation center of the lever link bracket.

4. The armrest unlocking device according to claim 1, wherein the elastic member is a spring.

5. An armrest-equipped seat having an armrest rotatably supported on a side surface of a seat back through a support unit,
wherein: the armrest is configured in which a lock gear is biased by an elastic member and rotated about a rotation center of the lock gear to be locked with a sector gear fixed on the support unit for locking the armrest;
a lever link bracket is manipulated to pull the lock gear to release locking between the lock gear and the sector gear for unlocking fixing of the armrest; and
in the lock gear, the rotation center is matched with a gravity center position.

6. The armrest-equipped seat according to claim 5, wherein the lever link bracket is rotated about a rotation center of the lever link bracket to rotate the lock gear about the rotation center of the lock gear through an engagement part between the lever link bracket and the lock gear, and the lock gear releases the locking between the lock gear and the sector gear.

7. The armrest-equipped seat according to claim 5, wherein the lever link bracket is configured to be manipulated to rotate about a rotation center of the lever link bracket.

8. The armrest-equipped seat according to claim 5, wherein the elastic member is a spring.

9. An armrest unlocking device comprising
a sector gear;
a lock gear configured to be rotated about a rotation center of the lock gear to be in a position locked with the sector gear or in a position unlocked from the sector gear, wherein the rotation center of the lock gear is matched with a gravity center position of the lock gear;
an elastic member biasing the lock gear in the position locked with the sector gear; and
a lever link bracket configured to be manipulated to pull the lock gear so as to rotate the lock gear about the rotation center of the lock gear into the position unlocked from the sector gear.

10. The armrest unlocking device according to claim 9, wherein the lever link bracket is configured to be rotated about a rotation center of the lever link bracket to rotate the lock gear about the rotation center of the lock gear through an engagement part between the lever link bracket and the lock gear.

11. The armrest unlocking device according to claim 9, wherein the lever link bracket is configured to be manipulated to rotate about a rotation center of the lever link bracket.

12. The armrest unlocking device according to claim 9, wherein the elastic member is a spring.

13. An armrest-equipped seat, comprising:
a seat having a seat back;
an armrest having a base frame rotatably supported on a side surface of the seat back through a support unit; and
the armrest unlocking device according to claim 9,
wherein the sector gear is fixed on the support unit and wherein the armrest unlocking device allows rotation of the armrest when the lock gear is in the position unlocked with the sector gear and prevents rotation of the armrest when the lock gear is in the position locked with the sector gear.

14. The armrest-equipped seat according to claim 13, wherein the lever link bracket is configured to be rotated about a rotation center of the lever link bracket to rotate the lock gear about the rotation center of the lock gear through an engagement part between the lever link bracket and the lock gear.

15. The armrest-equipped seat according to claim 13, wherein the lever link bracket is configured to be manipulated to rotate about a rotation center of the lever link bracket.

16. The armrest-equipped seat according to claim 13, wherein the elastic member is a spring.

\* \* \* \* \*